United States Patent [19]
Stuhr et al.

[11] Patent Number: 5,426,353
[45] Date of Patent: Jun. 20, 1995

[54] SYNCHRONOUS MOTOR SYSTEM EMPLOYING A NON-SYNCHRONOUS MOTOR FOR ENHANCED TORQUE OUTPUT

[75] Inventors: Leslie P. Stuhr, Corcoran; Edward L. Schwarz, Minneapolis, both of Minn.

[73] Assignee: Honeywell Inc., Minneapolis, Minn.

[21] Appl. No.: 39,616

[22] Filed: Mar. 30, 1993

[51] Int. Cl.⁶ .............................................. F16K 31/04
[52] U.S. Cl. ...................................... 318/15; 318/40; 318/51
[58] Field of Search ............................. 318/560–664, 318/8, 34–89, 15, 160; 101/48; 74/431; 185/40; 123/399; 251/129.11

[56] References Cited

U.S. PATENT DOCUMENTS

| | | | |
|---|---|---|---|
| Re. 32,610 | 2/1988 | Washbourn et al. | 318/372 |
| 3,569,782 | 3/1971 | Salihi et al. | 310/115 |
| 3,946,260 | 3/1976 | Frezzolini et al. | 310/112 |
| 4,025,830 | 5/1977 | Delaporte | 318/6 |
| 4,270,452 | 6/1981 | Gertsch et al. | 101/148 |
| 4,501,999 | 2/1985 | Kohzai et al. | 318/632 |
| 4,591,772 | 5/1986 | Hollow | 318/632 |
| 4,595,081 | 6/1986 | Parsons | 251/129.11 |
| 4,677,355 | 6/1987 | Baumann | 318/40 X |
| 4,741,508 | 5/1988 | Fukamachi | 251/71 |
| 5,015,938 | 5/1991 | Oehler et al. | 318/696 |
| 5,016,589 | 5/1991 | Terazawa | 123/399 |
| 5,083,066 | 1/1992 | Kohari et al. | 318/41 |
| 5,085,401 | 2/1992 | Botting et al. | 251/129.11 |
| 5,182,498 | 1/1993 | Stuhr | 318/15 |

FOREIGN PATENT DOCUMENTS

88016323 U 4/1988 Germany.

OTHER PUBLICATIONS

NTIS Tech. Notes, Roger Ratliff, Dec. 1991, p. 947.

*Primary Examiner*—Paul Ip
*Attorney, Agent, or Firm*—Edward L. Schwarz

[57] ABSTRACT

A rotary actuator derives its power from a synchronous motor preferably of the AC type providing constant output speed, and from a non-synchronous motor, preferably of the DC type, in a helper capacity to provide additional torque for a load. Use of certain types of non-synchronous motors to provide a portion of the maximum torque is cheaper than using a synchronous motor whose size is adequate for the maximum torque requirement. A torque limiting clutch which couples the non-synchronous motor output to the synchronous motor output allows the non-synchronous motor to run compatibly with the synchronous motor. A hysteresis coupling type of torque limiting clutch is preferred. In a preferred embodiment, both of the motors drive a gear train, with the non-synchronous motor coupled to the gear train by the torque limiting clutch.

5 Claims, 1 Drawing Sheet

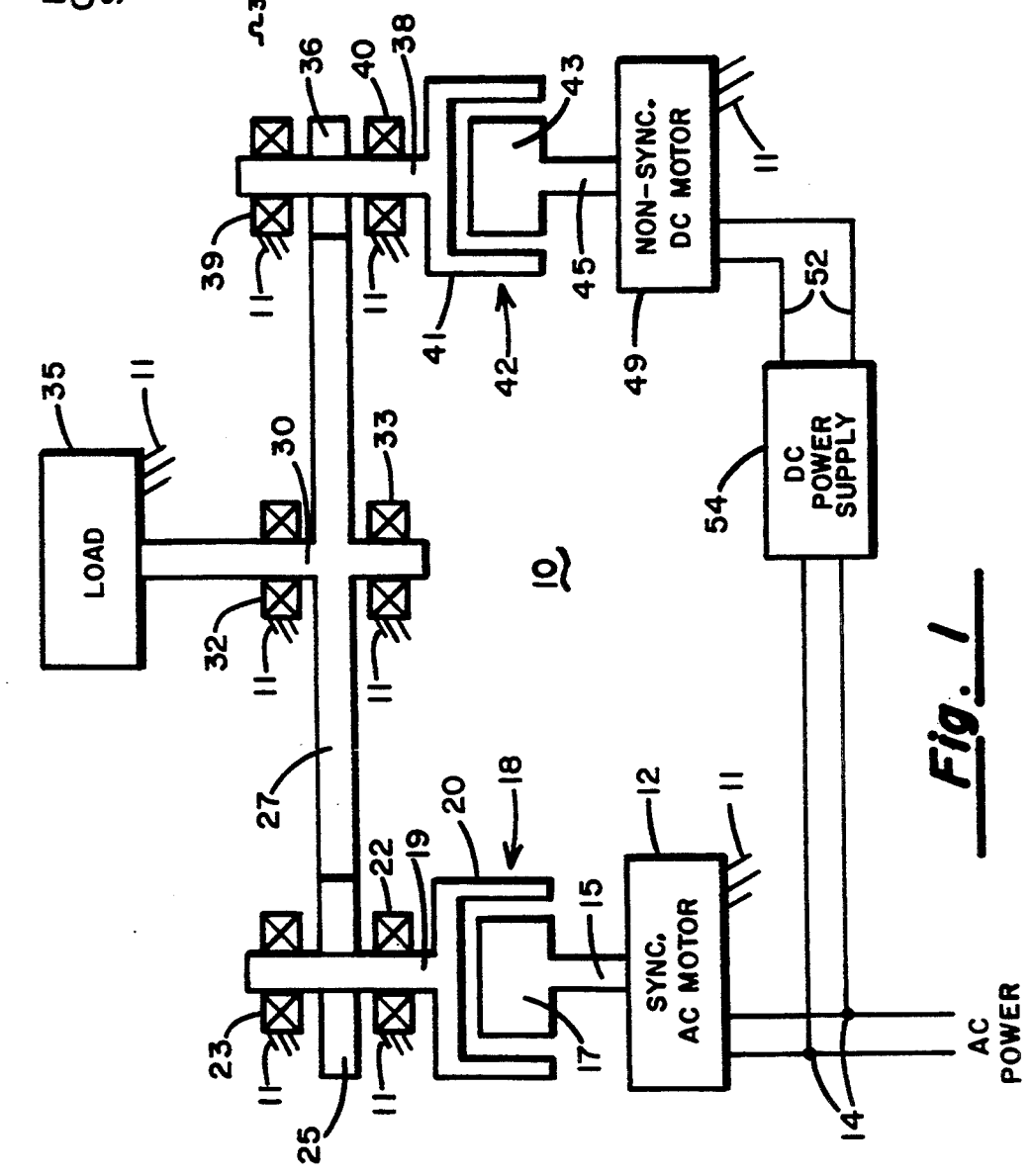
Fig. 1
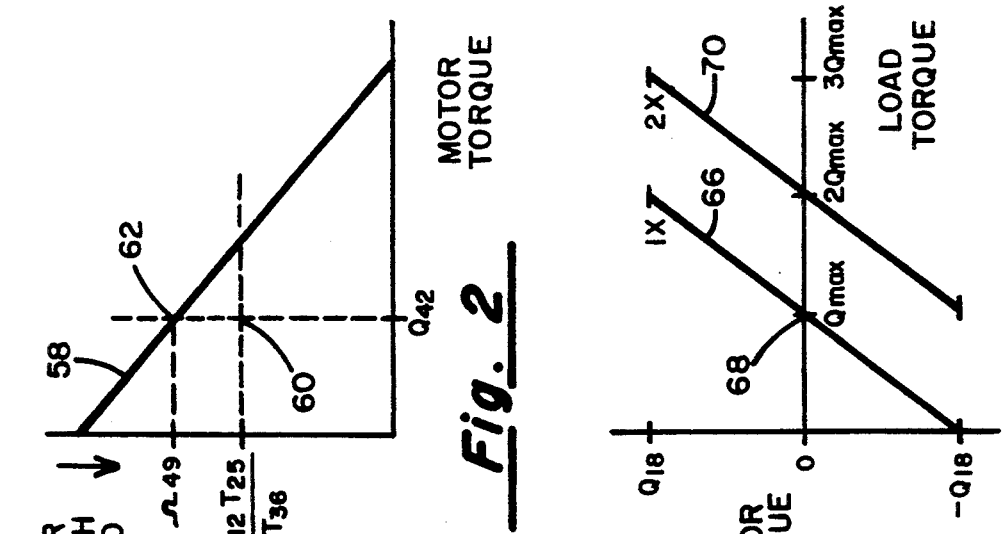
Fig. 2
Fig. 3

SYNCHRONOUS MOTOR SYSTEM EMPLOYING A NON-SYNCHRONOUS MOTOR FOR ENHANCED TORQUE OUTPUT

BACKGROUND OF THE INVENTION

Motor driven actuators are used to provide a variety of movement or operating functions in many different devices in common use today. For example, actuators are used to operate dampers and valves in HVAC systems, fluid values in manufacturing operations, and door openers. Since the time and duration of each actuation event depends on the specific application, electronically based controllers are used to provide operating power to the actuator at preprogrammed times or upon occurrence of preselected events which sensors attached to the controller detect. Actuators have either linear or rotary output, and the invention to be described may be implemented in either design. The intended use of the invention is in rotary actuators however, and the following discussion is directed to such an embodiment. One should understand that rotary actuator principles can frequently be applied to linear actuators. Further, by the use of a mechanical linkage or a rack and pinion gear set, it is easy to convert rotary movement to linear.

The basic design of rotary actuators is very simple. An electric motor drives the output element through a step-down gear train which amplifies the torque from the motor while reducing the speed of rotation. In the case of a rotary actuator, the linkage is almost invariably a gear train, and in the case of a linear actuator, will usually be a gear train terminating in a rack and pinion for the linear operation. The output speed of a typical rotary actuator is on the order of a few RPM at most, and may be less than one RPM. The maximum range of rotation for a rotary actuator is typically less than one revolution, with the direction of rotation controllable within that range. There are also certain types of non-reversible rotary actuators which rotate a fraction of a revolution at each actuation and are used for driving loads for which such operation is suitable. For example, cam-operated valves can be opened or closed with each half turn of the actuator shaft.

In many of these actuator applications, there is no need for high precision in positioning the load. For example, where the application is partially opening a valve, there already is some uncertainty in the flow rate for a given percentage of valve opening, so high precision in the angular position of the actuator is not necessary. In such uses, the expense of closed loop operation is unjustifiable, but there is a need for accuracy of a few percent or so in achieving a specified position. Use of a synchronous fixed speed motor as the prime mover in an actuator results in output speed which is independent of load or voltage, frequently allowing satisfactory control of actuator position based solely on operating time. A disadvantage of a synchronous motor as the prime mover in an actuator is its relatively high initial cost for a given power output as compared to that of certain types of non-synchronous motors, particularly DC motors. This extra cost reduces the advantage of operating open loop which the synchronous motors have over non-synchronous motors. DC motors are also more efficient than synchronous motors in converting electrical energy into mechanical energy, which may also have significance in certain applications.

In certain actuator applications it is necessary for reasons of safety or convenience to assure that the actuator returns its output element and the load to a particular safety or home position if a power outage occurs or if improper operation of the controller removes power from the actuator. These automatic return types of actuators must store energy in some way in order to provide the power return to home. There are two ways in which the power is currently stored. In some actuators a storage battery provides electrical power used by the motor when the power return function is required. This design has the disadvantages that the battery may deteriorate over time, a separate charging circuit is needed, and weight and cost are substantial.

The more common design of power return actuator has a coil spring which stores energy for release when the return function is needed. In the simplest of these, the spring is permanently connected to the drive train and winds and unwinds as the motor drives the output shaft in the outward and return directions. Such a design has the advantage of simplicity, but there are a number of disadvantages which arise. One is that the torque output is asymmetrical, being substantially less during the outward rotation against the spring than on return. This asymmetry is exacerbated by the well-known characteristic of coil springs to require several times more torque to wind than is provided during their unwinding, mainly because of the friction between adjacent turns of the spring. Further, many loads have symmetric torque requirements, and application of excessive torque in either direction has the potential of damaging the load. For example, if the load is a valve, one will realize from personal experience at a bathroom sink that a valve requires roughly the same maximum torque when opening as when closing. One will also realize that if the closing torque is substantially greater than the opening torque available, it is possible that the actuator will not even be able to open the valve. Of course the problem of asymmetric torque output can be alleviated by use of a slip clutch with a symmetric release torque. But the asymmetric torque level still requires a drive motor large enough to handle the largest power demand by the intended load, increasing cost and power requirements for the actuator itself.

The problem of the relatively high cost to output power ratio for synchronous motors is compounded in direct coupled spring return types of actuators, since it is necessary to specify a synchronous motor for with much more power than normal operation of the load requires, in order to have sufficient additional power to wind the spring during the outward excursion of the shaft. Because of this substantially greater torque requirement, spring return actuators with constant speed during normal operation are relatively large and heavy, use power inefficiently, and are costly.

Because of these disadvantages of direct coupled return springs, a recent design described in U.S. Pat. No. 5,182,498 entitled *Spring Return Rotary Actuator* and having a common patentee and assignee with the present application solves the problem by introducing a special spring winding phase of operation in which a non-synchronous motor provides helping torque for winding the spring. When power is applied to the actuator, a sensor determines whether the spring is in a fully wound condition. If not, the spring winding phase is initiated during which the spring is fully wound and then held in this condition by a brake. With the spring held locked, operation of the actuator then proceeds until the condition for spring return arises, as though the actuator is a non-return type. When spring return is required, then the brake is released and the spring applies torque through the gear train to the output shaft to return the load to its home position. The actuator described in the '498 patent uses a planetary gear system to connect the load, spring, and motor.

In order for the '498 patent's actuator to reach, during spring-powered operation, the torque and power output which is provided by the motor, it is necessary because of the characteristics of planetary gear systems to use a spring whose direct torque output is roughly equivalent to that of the motor itself. Because of the additional torque required to wind the spring, this design also has required an oversized synchronous motor for power. Various attempts to increase the gear ratio of the synchronous motor when winding the spring so as to require no more motor torque than does normal operation have turned out to be less satisfactory than a motor of adequate size.

Accordingly, any simple and cheap design which might allow the normal torque output level of the synchronous motor in the '498 patent's actuator to wind up the spring has the potential to reduce its cost. However, such designs have not been available to date.

BRIEF DESCRIPTION OF THE INVENTION

We have found that it is possible to generalize on the teachings of the '498 patent by coupling certain types of non-synchronous motors with a relatively small synchronous motor in order to achieve synchronous operation imitating the operation of a much larger synchronous motor at low cost. In order to provide this operation, the output shafts of the synchronous and non-synchronous motors must be coupled by a torque or force limiting slip clutch. The original purpose of this invention is to allow winding by a synchronous motor of the return spring in an actuator built according to the '498 patent. There is, however, no technical reason preventing use of the invention in any application where there is a need for synchronously driving a load and at the same time avoiding the related cost and efficiency penalties of using a single motor of the synchronous type.

Motor-driven actuator apparatus which provides such synchronous operation by cooperation between a synchronous motor and a non-synchronous motor comprises a frame on which is mounted an output linkage having first and second input members and an output member. A synchronous motor is mounted on the frame and has an output member connected to provide torque to the output linkage's first input member. A torque limiting clutch having an input member and an output member transmits a preselected maximum amount of torque from the input member to the output member. The clutch's output member is connected to provide torque to the second input member of the output linkage. A non-synchronous motor is mounted on the frame and has an output member connected to provide torque to the input member of the torque limiting clutch. It has been found that the apparatus operates unstably if the non-synchronous motor's output element is connected directly to the synchronous motor's output element.

The effective speed of the non-synchronous motor must be greater than that of the synchronous motor. By "effective" speed is meant the speed of the non-synchronous motor at the torque limit of the torque-limiting clutch as reflected back through any gear train between the output member of the non-synchronous motor to the output member of the synchronous motor.

In the preferred embodiment, the synchronous motor is an AC motor, and the non-synchronous motor is a DC motor. It is also possible to use a non-synchronous type of AC motor such as an induction motor, but the cost and power efficiency advantages are not as great as with a DC motor.

BRIEF DESCRIPTION OF THE DRAWING

FIG. 1 shows a plan view of an actuator whose configuration embodies the invention.

FIG. 2 is a graph of speed versus torque showing the preferred operating conditions for the invention.

FIG. 3 is a graph of AC motor torque versus load torque for the invention.

DESCRIPTION OF THE PREFERRED EMBODIMENT

FIG. 1 shows an actuator 10 which uses a gear train as the output linkage to transmit torque to a load 35 through an output member of the linkage comprising shaft 30. Individual elements of actuator 10 are mounted on a frame 11 shown symbolically as supporting various of the actuator elements as well as load 35. Bearings are shown symbolically as at 22 with a pair of "X" markings within a rectangle. Meshing between a pair of gears is shown with a heavy line at the point of intersection as for example between gears 25 and 27.

Synchronous torque is provided on a shaft 15 by a synchronous AC motor 12 mounted on frame 11 and receiving AC power of a standardized frequency, typically 60 hz. in the United States, and 50 hz. in other countries. The speed of shaft 15 depends only on the frequency of the power applied to motor 12 until the torque rating of motor 12 is exceeded. A typical speed for a motor 12 to be used in a small actuator may be 600 RPM when used with 60 hz power. It is inadvisable to exceed the torque rating of a synchronous motor, not because the motor 12 might be damaged, but because the gear train which receives its torque may be damaged by torque pulses which cause one or a few gear teeth to pound against each other.

Motor 12 applies torque through shaft 15 to a permanent magnet rotor 17 comprising the input element of a magnetic drag type torque limiting clutch 18. Clutch 18 has an output element comprising a cup 20 which transmits a designed-in torque level from rotor 17 to output shaft 19. These magnetic drag clutches are designed to transmit a predetermined amount of torque which is relatively independent of shaft speed. In the apparatus of FIG. 1, clutch 18 is optional, but strongly preferred. If present, clutch 18 should have a design torque which is less than the starting torque of motor 12. Clutch 18 prevents possible damage to motor 12 arising from radial loading on its bearings and if overloaded, allows motor 12 to continue to run at its synchronous speed without subjecting the load to torque pulses arising from the rotating magnetic field in motor 12. With a properly sized clutch 18 present, motor 12 speed remains constant at its synchronous value regardless of the load torque presented to its output element 20. When the output element 20 is subject to a load whose torque is greater than the clutch's design amount, output shaft 19 simply stalls with motor 12 continuing to run at its synchronous speed. These magnetic drag clutches such as clutch 18 are designed to operate indefinitely with high levels of slip. Mechanical slip clutches do not have this tolerance of slip, and thus are less desirable in an application where high and continuous levels of slip are possible.

Shaft 19 is mounted for rotation in bearings 22 and 23 which are mounted on frame 11. A spur gear 25 is fixed to shaft 19 and engages an output gear 27 for transmission of torque to an output shaft 30 on which output gear 27 is supported for rotation. Gears 25 and 27 represent a gear train which substantially reduces the speed and increases the torque provided by the motor 12 to the output shaft 30. A more typical design will have three or more gears in a compound train between shafts 19 and 30 so as to increase the compactness of the apparatus. It is not unusual in rotary actuators to have a gear ratio between the drive motor 15 and the output shaft 30 which reduces the speed of motor 12 by several hundred to several thousand times. Output shaft 30 is supported by bearings 32 and 33 shown as mounted on frame 11. Shaft 30 is shown driving an external load 35. When operating synchronously, power and torque provided to load 35 are directly proportional. Hereafter, the operation of the apparatus of FIG. 1 will be discussed in terms of the torque which is created at the various shafts, but one should understand that during synchronous operation of a particular shaft, the term "power" may be substituted for the term "torque" in the discussion.

The reader will understand that a fixed, synchronous speed of gear 25 results in a much slower but still fixed, synchronous speed for shaft 30. For the simple gear train shown in FIG. 1, the synchronous speed for shaft 30 is $\Omega_{19} T_{25}/T_{27}$, where $\Omega_{19}$ is the rotational speed of shaft 19 and $T_{25}$ and $T_{27}$ are the number of teeth on gears 25 and 27 respectively. With a fixed speed of output shaft 30, it is possible to determine the amount of angular movement of shaft 30 with excellent accuracy during an operating interval by simply measuring the duration of the operating interval. In fact, the only factor preventing precise determination of position based on operating time is the uncertainty in startup time, when motor 12 runs on a non-synchronous starting winding for a short period of time to reach synchronous operation. The small stepper type of motors which can be run in a synchronous mode when used in actuators, have starting torques that are very similar to their running torques. Since the starting torque of a speed reducing gear train, where friction forces predominate over inertial forces, is very similar to the synchronous running torque requirement, motor 12 will operate non-synchronously for only a very small part of each operating interval, and hence will not appreciably affect the accuracy in determining shaft 30's new position.

A non-synchronous motor 49 provides additional torque to output gear 27 through shaft 45, a second torque limiting clutch 42, shaft 38, and spur gear 36. Clutch 36 is similar to clutch 18, having a magnetic rotor 43 as its input element and a cup 41 as its output element, and transmitting no more than a level of torque established by the design of the clutch 42. Shaft 38 is supported by bearings 39 and 40 shown mounted on frame 11. Motor 49 may be an AC induction motor, but preferably as shown is a DC motor receiving power from a DC power supply 54 on path 52. Typical motors used as motor 49 develop maximum power when run at a substantially higher speed than the synchronous design of motor 12, particularly if motor 49 is of the DC type. To make the speeds of the two motors more compatible, the gear ratios between their respective clutch output shafts 19 and 38, and shaft 30 will be different in the usual design. Thus, in FIG. 1, the number of teeth on gear 25, $T_{25}$, is shown as approximately a third greater than that on gear 36, $T_{36}$.

Clutch 42 must be present to couple the torque provided by motor 49 to the gear train driving shaft 30, and must be sized to constantly slip. The torque load which clutch 42 imposes on motor 49 must yield a motor 49 speed higher than the speed of shaft 38 which corresponds to synchronous operation as determined by the gear ratio between shaft 38 and shaft 30 and the gear ratio between shaft 19 and shaft 30. For the simple gear train shown, the corresponding synchronous speed for shaft 38 is $\Omega_{38} = T_{25} \Omega_{12}/T_{36}$ where $T_{25}$ and $T_{36}$ are the respective number of teeth on gears 25 and 36 and $\Omega_{12}$ is the rotational speed of shaft 12. With motor 49 running faster than the synchronous speed $\Omega_{38}$ for shaft 38, this implies that clutch 42 operates with constant slip. Without constant slip by clutch 42, it is almost impossible to couple motor 49 into the gear train of FIG. 1 and achieve both synchronous speed of shaft 30 and torque input from motor 49.

FIG. 2 is a graph which helps one to better understand the design requirements for clutch 42 and motor 49 in the device of FIG. 1. In FIG. 2, line 58 represents the hypothetical speed-torque characteristics of a typical series wound DC motor 49. The reader can see that over a wide operating speed range, motor 49 speed decreases as the amount of rotation-opposing load torque on shaft 45 increases. For a given voltage input on paths 52, motor 49 provides a determinable amount of speed at every torque level. The converse is of course also true, which is that for a given input voltage, each motor shaft 45 speed produces a determinable amount of torque. Clutch 42 constantly slips, and therefore imposes a constant torque load on motor 49. The torque at which clutch 42 is designed to slip must yield a speed for motor 49 on line 58 which is at least that corresponding to the speed of shaft 38 which matches the fixed or synchronous speed of shaft 30 and preferably should be somewhat greater to allow for expected variation in D.C. Input voltage which could otherwise cause the D.C. motor torque or speed (RPM) to drop. The synchronous speed $\Omega_{38}$ of shaft 38 which corresponds to the synchronous speed $\Omega_{12}$ of motor 12 is given by the formula $\Omega_{38} = T_{25} \cdot \Omega_{12}/T_{36}$ where $T_{25}$ and $T_{36}$ are the respective number of teeth on gears 25 and 36. Synchronous speed $\Omega_{38}$ should correspond to a torque output from motor 49 which causes clutch 42 to continuously slip. FIG. 2 in fact shows this situation with an operating point for motor 49 at 62, where motor 49 is generating torque at a shaft speed $\Omega_{49}$, and clutch 42 is transmitting torque $Q_{42}$ to shaft 38 and shaft 38 is rotating at $\Omega_{38}$ RPM, its synchronous speed. The amount of slip in clutch 42 is simply $\Omega_{49} - \Omega_{38}$. The operating point for shaft 38 is shown at 60, where torque is still $Q_{42}$, but speed is $\Omega_{38}$, the speed corresponding to synchronous operation.

It is however, possible for the system of FIG. 1 to operate non-synchronously under certain conditions. This condition may arise either with load 35 absorbing too little or too much torque. In the former case, DC motor 49 and clutch 42 provide so much torque to gear 27 that clutch 18 slips with shaft 19 rotating more rapidly than shaft 15. In the latter case, clutch 18 slips with shaft 19 rotating more slowly than shaft 15, and usually stalled.

Consider first the situation where there is no load torque on shaft 30. Assume that the torque transmitting capability of clutch 18 is the same in both directions of rotation, a reasonable assumption. If clutch 18 is omitted, then the ability of motor 12 to resist desynchronizing because of active external torque applied to shaft 15 to increase its speed becomes the limiting factor, and the assumption in this case of equal torque capabilities in both the forward and load situations is also reasonable. In the no load torque case, motor 49 applies torque through clutch 42 and the gear train to shaft 30 and motor 12, attempting to rotate shaft 19 at faster than motor 12's synchronous speed $\Omega_{12}$ and shaft 30 at a speed faster than its synchronous speed $\Omega_{12}T_{25}/T_{27}$ corresponding to synchronous operation by motor 12. In order to maintain synchronous operation when load 35 absorbs no torque, the resisting torque applied by clutch 18 to shaft 19 must be greater than the resultant torque $Q_{42} T_{25}/T_{36}$ applied by clutch 42 through the gear train to shaft 19. If this condition is not satisfied, shaft 19 will pull out of synchronism in the forward direction. If a different gear train is used, then a different formula will be necessary to determine the point at which operation pulls out of synchronism.

To maintain synchronous operation, it is also necessary that the load torque absorbed from shaft 30 by the external load 35 not be greater than the sum of the torques provided at shaft 30 by shafts 19 and 38 through the gears 25, 27, and 36. That is, the load torque must be less than $T_{27}[(Q_{42}/T_{36})+(Q_{18}/T_{25})]$ where $Q_{18}$ is the maximum torque available on shaft 19 from motor 12 and $Q_{42}$ is the torque provided from motor 49 by clutch 42, to prevent non-synchronous operation by the output shaft 30. This is the overload condition for the device, where clutch 18 is slipping. In general, overloading will completely stall the apparatus, because the torque provided by clutches 18 and 42 is very nearly independent of slip.

If the load applies neither an overload or an underload, then the speed of output shaft 30 will be the synchronous speed $\Omega_{12}$ of motor 12 as reflected to shaft 30 by the reduction in the intervening gear train, or $\Omega_{12}T_{25}/T_{27}$. When these criteria are met, the operating torque for motor 49 will be very slightly higher than clutch 42 slip torque, and motor 49 will operate at point 62 where line $Q_{42}$ intersects the motor's operating line 58. The operating torque of motor 49 is slightly higher than the torque provided by clutch 42 at shaft 38 because of friction and magnetic losses in clutch 42 and bearings 40.

For the simple three gear train shown in FIG. 1, the selection of the gear ratios and torque levels transmitted by clutches 18 and 42 must satisfy $T_{27}[(Q_{42}/T_{36})+(Q_{18}T_{25})] > Q_L > T_{27}[(Q_{42}/T_{36})-(Q_{18}-T_{25})]$. For the simplest situation where load 35 torque can fall to zero, $Q_{49}/T_{27}T_{36}$ must not be greater than $Q_{18} T_{27}/T_{25}$ in order to satisfy the right hand inequality. If $Q_{18}/T_{25}=Q_{42}/T_{36}$, then the maximum value for $Q_L$ is $2Q_{18}\cdot T_{27}/T_{25}$. That is, the restriction for this type of operation is that if the minimum load torque is zero, maximum load torque which can be permitted without losing synchronous operation is twice the maximum effective torque which motor 12 can apply to shaft 30 through the gear train.

This analysis can be generalized to allow selection of the torque outputs of motors 18 and 49, the torque limits of clutches 18 and 42, and the gear train ratios to synchronously operate a load 35 whose maximum torque requirement is several times larger than the maximum load torque $Q_{max}$ ($=Q_{18}\cdot T_{27}/T_{25}$) which motor 12 by itself through clutch 18 can apply at shaft 30 to load 35. The graph of FIG. 3 illustrates this principle in the relationship between the varying torque supplied by AC motor 12 through clutch 18 to shaft 30 and load 35, and the torque absorbed by load 35. The load 35 torque varies along the abscissa and AC motor torque varies along the ordinate. The synchronous torque from AC motor 12 provided by clutch 18 varies from a negative value which represents the resistance provided by motor 12 and clutch 18 to overdriving resulting from torque supplied by motor 49 when torque required by load 35 is minimum, to the maximum when load 35 is demanding full torque from both motors through their clutches 18 and 42. Torque provided by motor 12 which resists overspeeding by motor 49 due to a small torque demand by load 35, is shown as a negative value in FIG. 3. The 1X label indicates load line 66 as representing the condition where the slip torque of clutch 42 provides torque equal to $Q_{42}\cdot T_{27}/T_{36}=Q_{max}$ at shaft 30. When load 35 torque is 0, then all of the DC motor 42 torque at shaft 30 is precisely balanced and resisted by the equivalent AC motor 12 torque at shaft 30. When load 35 is requiring full torque (which is $2Q_{max}$ for load line 66) then the contribution of torque to load 35 is $Q_{max}$ from each motor. Note that the power and torque supplied by each of motors 12 and 49 to load 35 is equal only at full load. Point 68 defines the condition where motor 12 and clutch 18 provide no torque contribution to operation and load 35 torque is exactly $Q_{max}$, all being supplied by motor 49.

Operating line 70 shows a situation where the minimum torque required by load 35 is $Q_{max}$ and the maximum torque required by load 35 is $3Q_{max}$. The maximum range of load is still $2Q_{max}$. In this case, motor 49 must apply torque of $2Q_{max}$ to shaft 30. In general, the size of the synchronous motor 12 and its clutch 18 is determined by the range of torque which the load will require, and must be at least half of this range. The torque capacity of non-synchronous motor 49 and its clutch 42 must be at least half the sum of the maximum torque and the minimum torque required by load 35.

As one more example, if an application arises where torque is required which ranges from say, 200 in-lb to 500 in-lb at the synchronous speed $\Omega_{12}\cdot T_{25}/T_{27}$ for shaft 30, then motor 12 and clutch 18 should be chosen to allow a $Q_{18}\cdot T_{27}/T_{25}$ ($=Q_{max}$) value of at least 150 in-lb and motor 49 and clutch 42 should be chosen to set $Q_{42}\cdot T_{27}/T_{36}=350$ in-lb at a shaft 38 speed $\Omega_{38}=\Omega_{12}\cdot T_{25}/T_{27}$ where $\Omega_{12}$ is the synchronous speed of motor 12. It can thus be seen that this arrangement allows the non-synchronous motor 49 to more than double the synchronous torque output provided at shaft 30 by motor 12.

There are a number of different kinds of loads which have a constant component or minimum torque. This may arise from gravity in the case of air duct damper blades or an elevator car, from a spring in the case of a spring return actuator, or from friction in bearings or a gear train. Most loads also have torque or power requirements which vary over a predictable range. By properly analyzing the variation in torque required and the minimum torque which the drive motors see, one can select the appropriate sizes for the drive motors in order to maintain synchronous operation for the application.

The reader can see that this invention allows synchronous operation using power from the combination of a synchronous AC motor and non-synchronous motor if the various components are properly specified. This allows a cheaper device and more efficient operation of it.

We claim:

1. A motor-driven actuator for providing synchronous torque at an actuator output member, said actuator designed for driving, through the actuator output member, a load having a predetermined minimum torque requirement and a predetermined maximum torque requirement greater than the predetermined minimum torque requirement, comprising
   a) a frame;
   b) a torque linkage mounted on the frame and having first and second input members cumulatively applying torque received at the torque linkages's input members to the actuator output member;
   c) a synchronous motor mounted on the frame and having an output member connected to provide torque to the torque linkage's first input member;
   d) a first torque limiting clutch transmitting a preselected maximum amount of torque from an input member thereof to an output member thereof connected to provide torque to the second input member of the output linkage; and
   e) a non-synchronous motor mounted on the frame and having an output member connected to provide torque to the input member of the first torque limiting clutch,
   wherein the synchronous motor has a maximum torque capacity such that the torque applied to the load by the synchronous motor through its output member and the torque linkage to the torque linkage'output member, is no less than the difference between the predetermined maximum and minimum load torque requirements.

2. The actuator of claim 1, wherein the non-synchronous motor has a torque capacity such that torque applied to the load by the non-synchronous motor through its output member, the first clutch, and the output linkage to the output linkage's output member, is at least half the sum of the predetermined minimum and maximum torque requirements.

3. The actuator of claim 1, wherein the non-synchronous motor, torque linkage, and torque limiting clutch have components which cooperatively apply torque to the synchronous motor's output member which is no greater than the maximum torque provided by the synchronous motor through its output member.

4. The actuator of claim 1, wherein the torque linkage and torque provided by the output of the torque limiting clutch to the torque linkage have components which cooperatively apply torque to the synchronous motor's output member which is no greater than the maximum torque provided by the synchronous motor through its output member.

5. The actuator of claim 1, wherein the non-synchronous motor has a torque capacity such that torque applied to the load by the non-synchronous motor through its output member, the first clutch, and the output linkage to the output linkage's output member, is approximately equal to half the sum of the predetermined minimum and maximum torque requirements.

* * * * *

UNITED STATES PATENT AND TRADEMARK OFFICE
CERTIFICATE OF CORRECTION

PATENT NO. : 5,426,353

DATED : June 20, 1995

INVENTOR(S) : Leslie P. Stuhr, Edward L. Schwarz

It is certified that error appears in the above-identified patent and that said Letters Patent is hereby corrected as shown below:

In column 10, line 3, after "linkage'" insert --s --;
after "than" insert --half--.

Signed and Sealed this

Seventeenth Day of October, 1995

Attest:

BRUCE LEHMAN

Attesting Officer

Commissioner of Patents and Trademarks